N. NILSON.
SCALE.
APPLICATION FILED JULY 17, 1908.
948,705.
Patented Feb. 8, 1910.
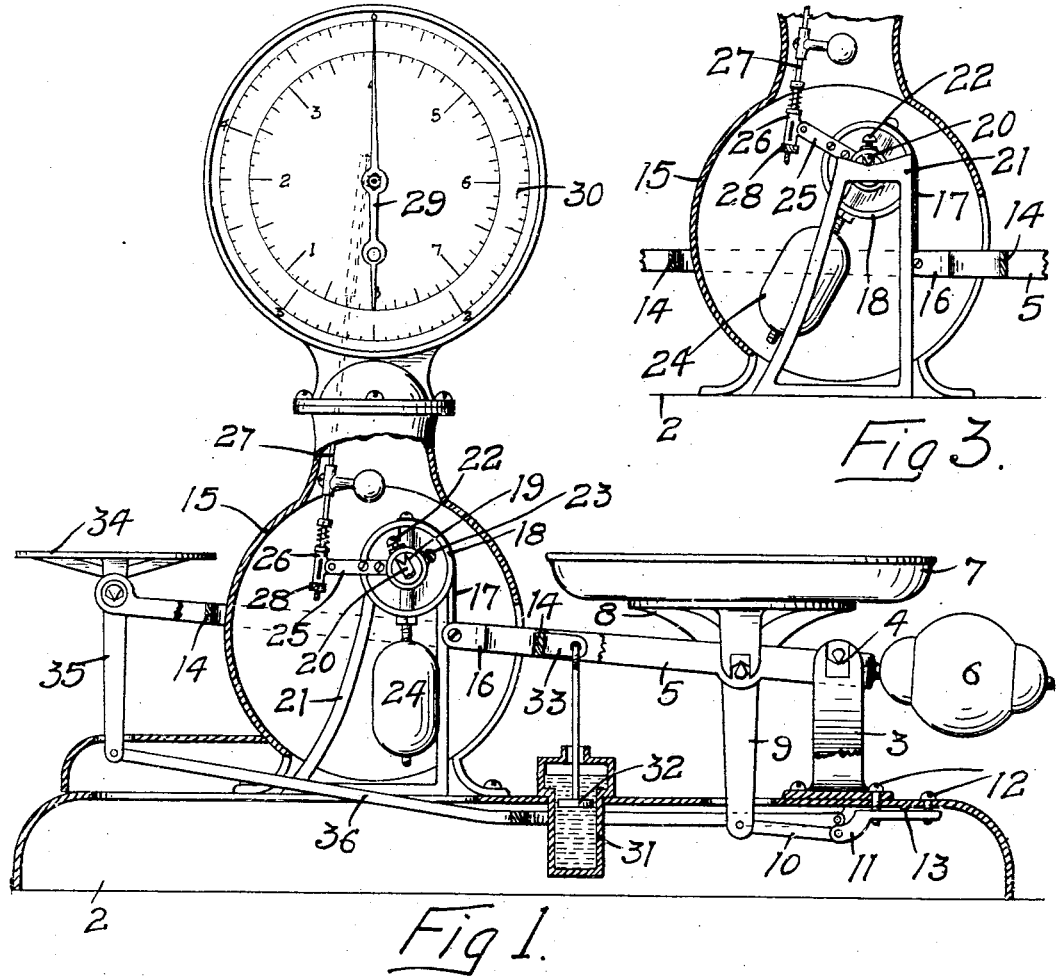
Fig 1.
Fig 3.
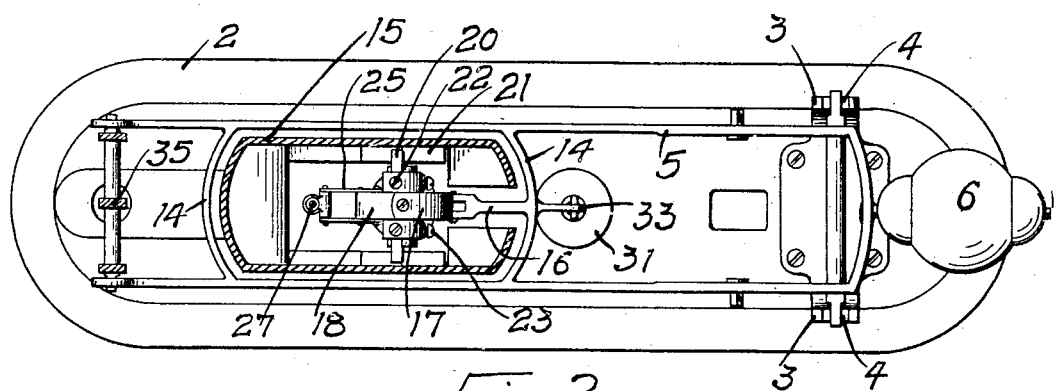
Fig 2.
WITNESSES
INVENTOR
NILS NILSON
BY
HIS ATTORNEYS

UNITED STATES PATENT OFFICE.

NILS NILSON, OF WAYZATA, MINNESOTA.

SCALE.

948,705.  Specification of Letters Patent.  Patented Feb. 8, 1910.

Application filed July 17, 1908. Serial No. 443,978.

*To all whom it may concern:*

Be it known that I, NILS NILSON, of Wayzata, Hennepin county, Minnesota, have invented certain new and useful Improvements in Scales, of which the following is a specification.

This invention relates to weighing scales employing a graduated dial and indicator hand therefor, and the object of the invention is to provide a scale which will permit the uniform spacing of the graduations of the dial and a further object is to provide a scale adapted for weighing heavy or very light articles.

The invention consists generally of various constructions and combinations, all as hereinafter described and particularly pointed out in the claims.

In the accompanying drawings, forming part of this specification, Figure 1 is a front elevation partially in section of a weighing scale embodying my invention. Fig. 2 is a horizontal sectional view of the same through the housing on which the indicator dial is supported, the right hand pan being removed. Fig. 3 is a detailed sectional view illustrating the form of connection employed between the scale beam and the indicator hand.

In the drawing, 2 represents the base of the scale, and 3 upright standards mounted thereon having bearings 4 for knife edge pivots provided on a beam 5. A balance weight 6 is provided on one end of the beam, and a scale pan 7 is supported on a platform 8 that has bearings on the beam 5 and is provided with a depending arm 9 which extends through the top of the scale base, and is connected by a link 10, with a plate 11 that is secured by screws 12 to the base, and is adapted to rock on a rib 13 provided thereon. This scale beam is in the form of a frame having parallel sides and cross bars 14 connecting said sides and inclosing a casing 15 wherein the connecting mechanism between the beam and the indicator hand is mounted. An arm 16 is provided on one of the cross-bars 14 and is connected to a strap 17 that is secured to the periphery of a wheel 18 having a hub 18' provided with radial slot 19 therein to receive a bar 20 which has knife edge pivots on standards 21, said bar being adjustable in said slot by means of set screws 22, and said hub being capable of rotary adjustment and locked by means of screws 23. A beam weight 24 is suspended from said wheel and arms 25 project radially therefrom and are pivotally connected to a box 26 in which a rod 27 having a thumb nut 28 thereon is slidable. The upper end of the rod 27 is operatively connected with an indicator hand 29, that is movable over a dial 30, having an inner and an outer circle of graduations. A dash pot device, comprising a cup 31, containing a suitable fluid and having a piston 32 pivotally connected to an arm 33 on one of the cross bars 14, is provided for the purpose of regulating the travel of the scale beam.

So far, the mechanism described corresponds substantially with that shown and described in a certain companion application filed herewith and further or more detailed description is not necessary. Instead of employing two beams as in said companion application, I extend the beam 5 beyond the casing 15 and provide a platform 34 having bearings on said beam and a depending arm 35 which extends down through the base, and is pivotally connected by a bar 36 with the plate 11. Adjustment of this plate, will tilt the depending arms 9 and 35 and enable the operator to adjust the scale platforms to the proper horizontal position. The platform 34 being located at the extreme end of the scale beam and a considerable distance from its pivot, will be effected by an extremely light weight placed thereon as it has a long leverage on the mechanism connecting the beam with the indicator hand. I am thus able to weigh accurately a comparatively heavy weight on the scale platform at the right of the figure and a very light weight on the platform at the left of the figure, the outer circle of graduations indicating the heavy weight and graduated accordingly, while the inner circle being more finely marked or graduated, will indicate the weight of the lighter article placed on the left hand platform, one end of the indicator hand moving over one graduation, while the opposite end moves over the other graduation. The arrangement of the mechanism between the scale beam and the indicator hand whereby a uniform spacing of the graduations is made possible, I have illustrated and fully described in the pending application herewith, and I make no claim therefore to the same in this case.

I claim as my invention:—

1. A scale, comprising a beam having a knife edge pivot at one end and a balance weight on one side of said pivot, scale platforms mounted on said beam on the other side of said pivot one of said platforms being near its beam pivot and the other near the opposite end of said beam from its pivot, a dial and indicator hand therefor and means operatively connecting said indicator hand with said beam.

2. A scale, comprising a beam having pivots and a balance weight on one side of said pivot, two scale platforms mounted on said beam on the other side of said pivot, one being located at the end of the beam and the other near the beam pivot, a dial having an inner and an outer circle of graduations and an indicator hand therefor, a wheel having bearings, and a balance weight, flexible means connecting the periphery of said wheel with said beam, and means operatively connecting said wheel with said indicator hand, the connection with said beam and wheel being located between said platforms, the weight of the article on one platform being indicated by one of the circle of graduations, and the weight of the article on the other platform being indicated by the movement of the needle over the other set of graduations, substantially as described.

In witness whereof, I have hereunto set my hand this 15th day of July 1908.

NILS NILSON.

Witnesses:
　RICHARD PAUL,
　JULIA A. BYINGTON.